United States Patent
Bernardi et al.

(10) Patent No.: US 6,817,902 B2
(45) Date of Patent: Nov. 16, 2004

(54) PLUG DEVICE FOR A STANDARD ELECTRICAL OR OPTICAL CONNECTION CORD

(75) Inventors: Christophe Bernardi, Sallanches (FR); Yves Guillot, Bonne (FR); Gabriel Tupin, Vougy (FR); Sandrine Baud, Thonon-les-Bains (FR); Stéphane Doit, Chamonix (FR); Emmanuel Lambert, Marnaz (FR)

(73) Assignee: Amphenol Socapex (FR)

(*) Notice: Subject to any disclaimer, the term of this patent is extended or adjusted under 35 U.S.C. 154(b) by 46 days.

(21) Appl. No.: 10/648,516

(22) Filed: Aug. 27, 2003

(65) Prior Publication Data
US 2004/0038588 A1 Feb. 26, 2004

Related U.S. Application Data

(63) Continuation-in-part of application No. 10/132,102, filed on Apr. 26, 2002, now abandoned.

(30) Foreign Application Priority Data

Feb. 5, 2002 (FR) .............................................. 02 01321
Dec. 9, 2002 (FR) .............................................. 02 15512

(51) Int. Cl.[7] ............................................... H01R 24/00
(52) U.S. Cl. .......................... 439/676; 439/462; 439/274
(58) Field of Search ................................. 439/696, 274, 439/275, 461, 462, 521

(56) References Cited

U.S. PATENT DOCUMENTS

| | | | | |
|---|---|---|---|---|
| 3,954,319 A | * | 5/1976 | Haines | 439/294 |
| 5,123,860 A | * | 6/1992 | Kamei et al. | 439/462 |
| 5,211,576 A | * | 5/1993 | Tonkiss et al. | 439/462 |
| 6,409,532 B2 | * | 6/2002 | Payson et al. | 439/320 |
| 6,582,248 B2 | * | 6/2003 | Bachman | 439/462 |

* cited by examiner

Primary Examiner—Hien Vu
(74) Attorney, Agent, or Firm—Blank Rome LLP

(57) ABSTRACT

The invention relates to a plug device for a standard electrical or optical connection cord (10) provided at an end with a cord plug (12) having a body which includes an external mechanical latch (16). The plug device comprises a plug body (20); a plug adapter (22) having external fastening means for engaging in said plug body; a packing body (30) including packing (32) of cylindrical shape; and a link part (28) having a first end for connection with said plug body and a second end for connection with said packing body; said plug adapter having an internal profile suitable for receiving said cord plug body (12) and having fastening means for engaging the cord plug body and for holding said latch (16) of the cord plug body in its inactive position.

8 Claims, 4 Drawing Sheets

PLUG DEVICE FOR A STANDARD ELECTRICAL OR OPTICAL CONNECTION CORD

CROSS-REFERENCE TO RELATED APPLICATIONS

The present application claims priority from French Patent Application No. 0215512 filed Dec. 9, 2002 and is a continuation-in-part of U.S. patent application Ser. No. 10/132,102 filed Apr. 26, 2002, now abandoned which in turn claims priority from French Patent Application No. 0201321 filed Feb. 5, 2002.

FIELD OF INVENTION

The present invention relates to a plug device for a standard electrical or optical connection cord provided at at least one of its ends with a plug presenting a body provided with an external mechanical latch.

At present, in the field of electrical installations, the main standards for ruggedized industrial networks have been created by the suppliers of control units: PROFIBUS™ from Siemens, FIP™ from Télémécanique, etc.

BACKGROUND OF THE INVENTION

The present trend is to escape from the constraints associated with such suppliers of control units by using a data transfer network on-site that is open, i.e. a network that is not dependent on any particular supplier of control units and that constitutes a genuine worldwide standard.

BRIEF SUMMARY OF THE INVENTION

Ethernet, which is a network already in use in offices for interconnecting computers and their peripherals, satisfies these conditions. The connectors used are known as the "RJ45" type. Connections are constituted by an optionally-shielded standard cord having plugs that are likewise standard mounted at its ends, each plug presenting a body which is provided with an external mechanical latch that can be retracted by pressing on one end of the latch. Naturally, the latch is used for mechanical fixing when making a connection with a jack.

Accompanying FIG. 1 shows the end of a standard cord fitted with a plug of a type that is also standard in the RJ45 or RJ11 system.

There can be seen the cord 10 and its plug 12 which comprises a body 14 that is generally overmolded onto the cord 10. A mechanical latch 16 is provided on the outside face of the body 14, which latch can be moved into an inactive position by a tongue 18 acting as a control lever.

Although that type of connector is well suited to the conditions that apply to the Ethernet standard, it is not at all suited to the industrial production environment in which splashes of liquids, shocks, untimely tugs on the cord, vibration, electromagnetic disturbances, etc., can all be encountered. Connection cords of the RJ45 or RJ11 type present the additional advantage that they are now standard cords which are available ready-calibrated with two over-molded RJ45 or RJ11 plugs, one at each end.

One solution for adapting RJ45 connectors to the constraints of the industrial environment would be to separate the standard cord from its plugs and replace those plugs with plugs of a conventional type used in an industrial environment.

Nevertheless, it will be understood that that would present two drawbacks:

firstly, because of the over-molding, eliminating the original plugs, and then wiring new plugs to the cord would lead to additional costs; and secondly, the benefit of the cord fitted with its two over-molded plugs being already calibrated is lost, and this runs the risk of reducing overall performance.

There therefore exists a real need to be able to transform a standard electrical cord fitted with a RJ45 type plug or the like into a standard cord fitted with a plug that is compatible with the industrial environment, while avoiding the drawbacks of the solution outlined above.

In the field of transmitting information using light signals, there exist problems that are similar or identical. Standard optical fiber cords are available having at least one plug body at at least one end, which body is provided with a mechanical latch. As with electrical cords, optical cords of this type are not adapted to use in an industrial manufacturing environment.

There thus exists the same need to transform a standard optical connection cord into a cord fitted with a plug that is compatible with an industrial environment.

To achieve this object, the present invention provides a plug device for a standard electrical or optical connection cord provided at an end with a cord plug fastened to the cord and having a body which includes an external mechanical latch fitted with a control lever having an active position and an inactive position, the plug device being characterized in that it comprises:

a plug body;

a plug adapter distinct from the plug body and having external fastening means for engaging in said plug body;

a packing body including packing of cylindrical shape and a screw thread; and a link part having a first end for connection with said plug body and a second end provided with a screw thread for co-operating with said screw thread of said packing body;

said plug adapter having an internal profile suitable for receiving said cord plug body and having fastening means for engaging the cord plug body and for holding said latch of the cord plug body in its inactive position;

said packing body, the packing when a rest, and said link part all defining respective internal passages of sufficient size to pass the cord plug body; and screwing the packing body onto said link part causing said packing to be compressed, thereby clamping said packing onto the standard cord.

It will be understood that by means of the invention is possible to insert the cord plug into the elements constituting the plug device so as to house the plug body inside the protective plug adapter. Furthermore, the plug adapter is shaped in such a manner as to hold the mechanical latch of the cord plug in its inactive position. In this way, the connection between the plug and the corresponding jack is made in conventional manner merely by the plug body.

It should also be emphasized that by compressing the packing, not only is the plug device assembly sealed, but the standard cord is fastened mechanically to the plug device in addition to the main fastening that results from the cord plug cooperating with the plug adapter.

Finally, and above all, the invention makes it possible to adapt the cord to an industrial environment without any need to separate the plug from the cord. The advantages relate equally well to the optical cords and to the electrical cords.

In a preferred embodiment, said plug adapter is constituted by two distinct parts, each defining a portion of the internal profile suitable for receiving said cord plug body, thereby enabling said two parts of said adapter to be put into place in succession on the cord plug body.

It will be understood that in this preferred embodiment, it is easier to mount the cord plug in the insulating adapter, since each of the parts can be put into place in succession in a lateral direction relative to the body of the cord plug.

Also preferably, each part of the plug adapter has a portion in relief forming an abutment suitable for co-operating with a portion of the latch of the cord plug when said latch is in its inactive position. This characteristic is particularly advantageous since in this way axial fastening between the cord plug and the plug adapter is obtained by a portion of the plug which has standardized dimensions. The plug adapter can thus be used regardless of the type or the manufacturer of the cord.

Other characteristics and advantages of the invention appear better on reading the following description of various embodiments of the invention given as non-limiting examples.

BRIEF DESCRIPTION OF THE SEVERAL VIEWS OF THE DRAWING

FIGS. 2 to 8 show the plug device implemented preferably for an electrical cord.

DETAILED DESCRIPTION OF THE INVENTION

Figure 1:
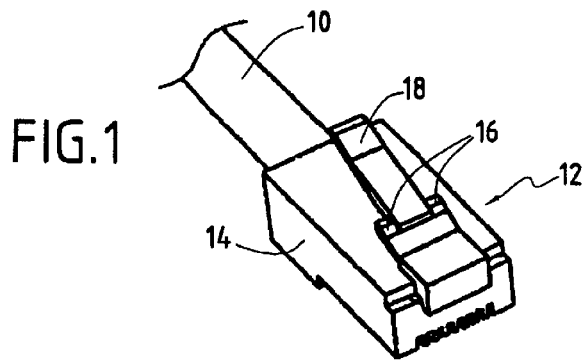
FIG. 1, described above, is a perspective view showing a standard electrical cord with its plug.
Figure 2:
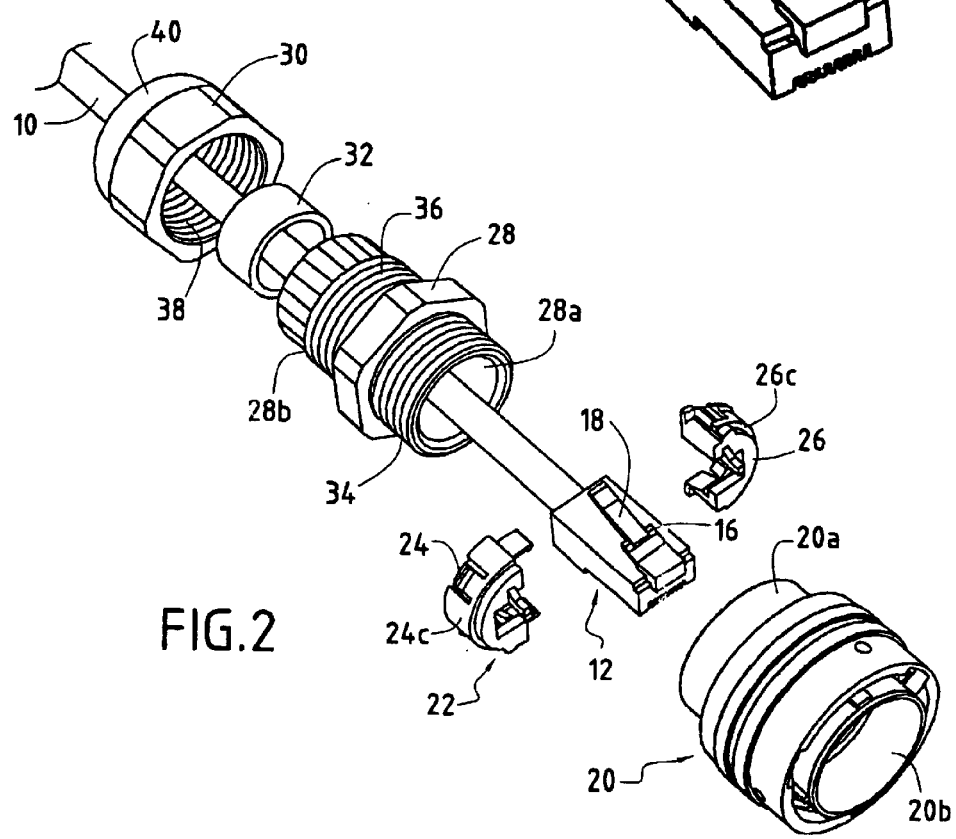
FIG. 2 is a perspective view showing the various component elements of the electrical-version plug device.
Figure 3:
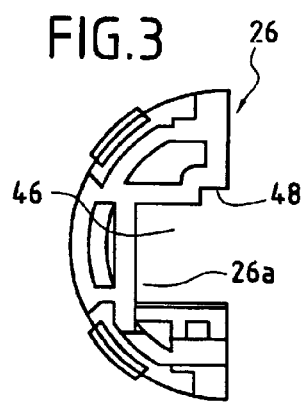
FIGS. 3 and 4 are detail views of two parts forming the insulating plug adapter.
Figure 4:
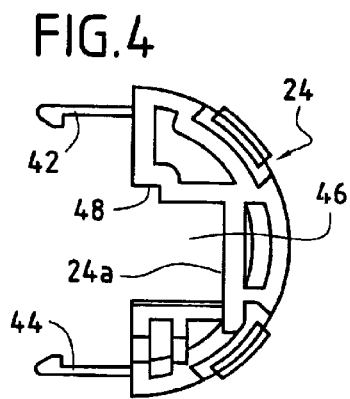

With reference initially to FIG. 2, there follows a description of the plug device assembly of the invention.

It comprises a plug body 20, a plug adapter 22 for the cord plug 10, which adapter is preferably constituted by two distinct parts 24 and 26, a link part 28, and a packing body 38 fitted with packing 32 of cylindrical shape.

The plug body 20 can be of any shape and on the inside it can have means for fastening the plug adapter 22 both axially and radially. It also has bayonet means for connection to a jack body (not shown). The plug body 20 also has tapping in its rear portion 20a.

The link part 28 has a front portion 28a and a rear portion 28b fitted with oppositely-handed threads 34 and 36.

The packing body 38 has tapping 38 and a rear wall 40 pierced by an axial orifice of sufficient size to allow the plug 12 of the cord 10 to pass through.

In the same manner, the link part 28 and the packing 32 both present an axial passage that is large enough to pass the plug 12 of the cord 10.

With reference now to FIGS. 3 to 6, there follows a description of a preferred embodiment of the plug adapter 22 and of the way in which it is secured to the plug 12.

The adapter 22 can be made of an insulating material, optionally metal-plated with a nickel or a cadmium alloy in order to provide electromagnetic protection.

The parts 24 and 26 forming the adapter 22 can be fastened to each other by clip members 42 and 44. Each part 24, 26 presents internal profiles 24a, 24b, which, once the two parts have been assembled together, define a recess 46 for receiving the body of the plug 12, the recess being surmounted by a groove 48 for receiving the control lever 18 of the plug 12 when it is in its lowered position corresponding to the latch 16 being deactivated.

Figure 5:
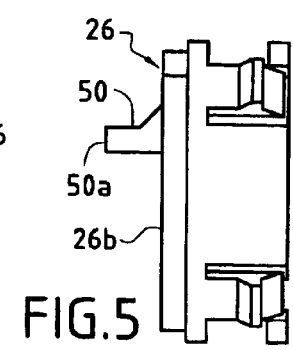
FIG. 5 is a side view of one of the parts of the plug adapter.
Figure 6:
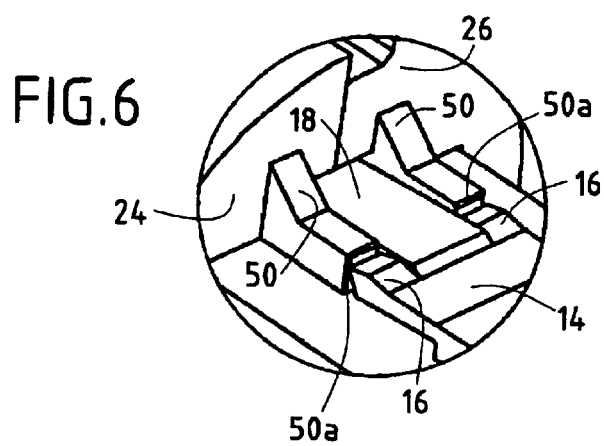
FIG. 6 is a detail view of the preceding figures showing how the cord plug latches in the plug adapter.

As shown more clearly in FIG. 5, each part 26 (24) has a beam-shaped extension 50 on its front face 26b (24b), and projecting from its front face. The extensions 50 are positioned in such a manner that when the body 14 of the plug 12 is inserted into the recess 46 in the adapter 22 and when the latch 16 is in its deactivated position, the ends 50a of the extensions 50 come into abutment against the latches 16. This is shown clearly in FIG. 6.

With reference now to FIGS. 2, 7, 8A, and 8B, there follows a description of how the plug device is mounted on the plug 12 of the cord 10.

Figure 7:
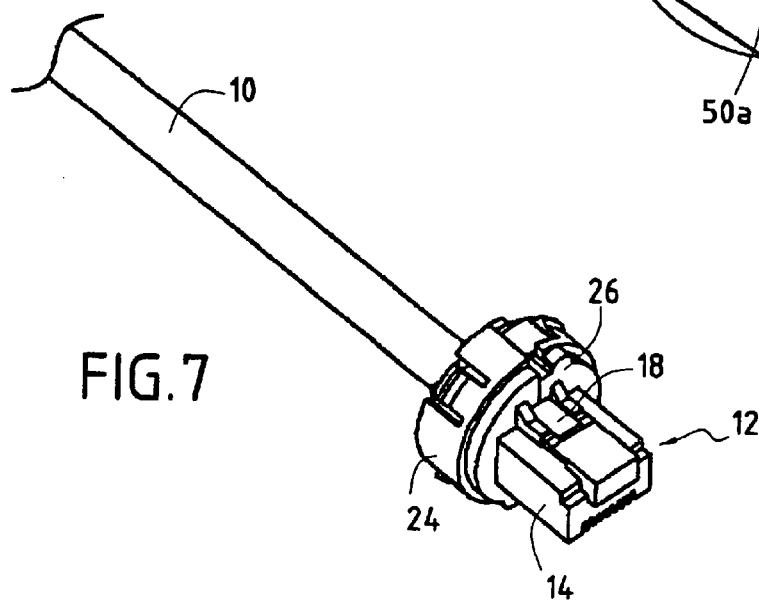
FIG. 7 shows the plug adapter mounted on the cord plug.

The link part 28, the packing 32, and the packing body 30 are all engaged on the cord 10 beyond the plug 12, as shown in FIG. 2. Then, after pressing the lever of the latch 16 down onto the plug 12, the part 26 of the adapter 22 is put into place. Thereafter, the second part 24 of the adapter is mounted on the plug body 14, thereby causing the parts 24 and 26 simultaneously to snap together. The adapter 22 is then fixed on the body 14 of the plug 12, as shown in FIG. 7.

The plug 12 and the adapter 22 are then inserted into the plug body 20. The outer wall 24c, 26c of the adapter preferably includes a projection, and the inner wall 20b of the plug body 20 has four notches that are offset by 90°. The adapter 22 is thus prevented from turning inside the plug body 20 and it can occupy one out of four coded positions.

Figure 8A:
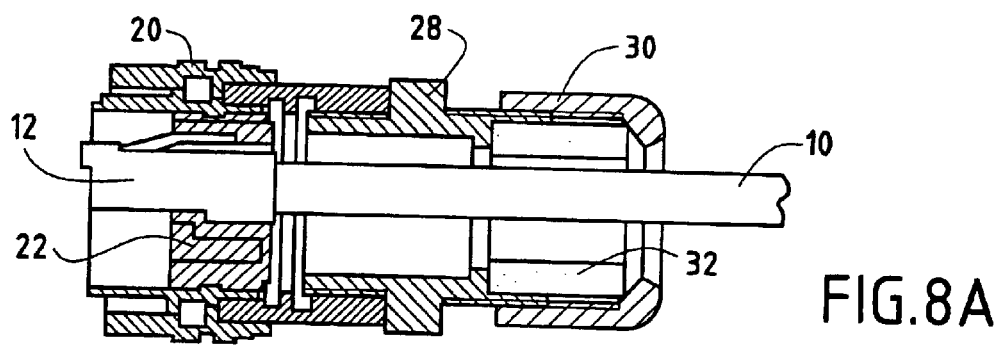
FIGS. 8A and B show the last two stages in assembling the plug device.
Figure 8B:
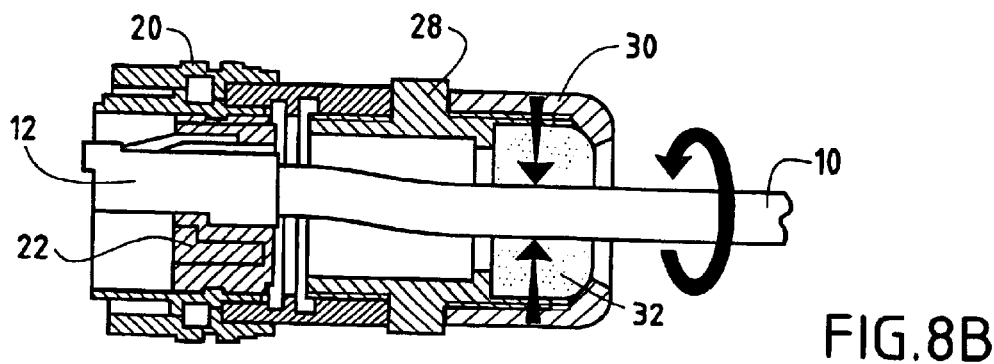

Finally, as shown in FIGS. 8A and 8B, the link part 28 is screwed onto the plug body 20, thereby preventing the adapter 22 from moving in translation relative to the plug body. The packing body 30 is then screwed onto the thread 36 of the link part, thereby compressing the packing 32 and clamping it onto the cord 10.

It should be emphasized that the plug 12 is prevented from moving in translation relative to the adapter 22 because the ends 50a of the extensions 50 of the adapter 22 come into abutment against the latch 16 in the deactivated position. The latch 16 is of standardized dimensions. The plug device of the invention can therefore be used with all cords whose plugs have latches complying with the standard.

The link part 28 is preferably provided on its second end with an O-ring suitable for co-operating with said packing body.

Figure 9:
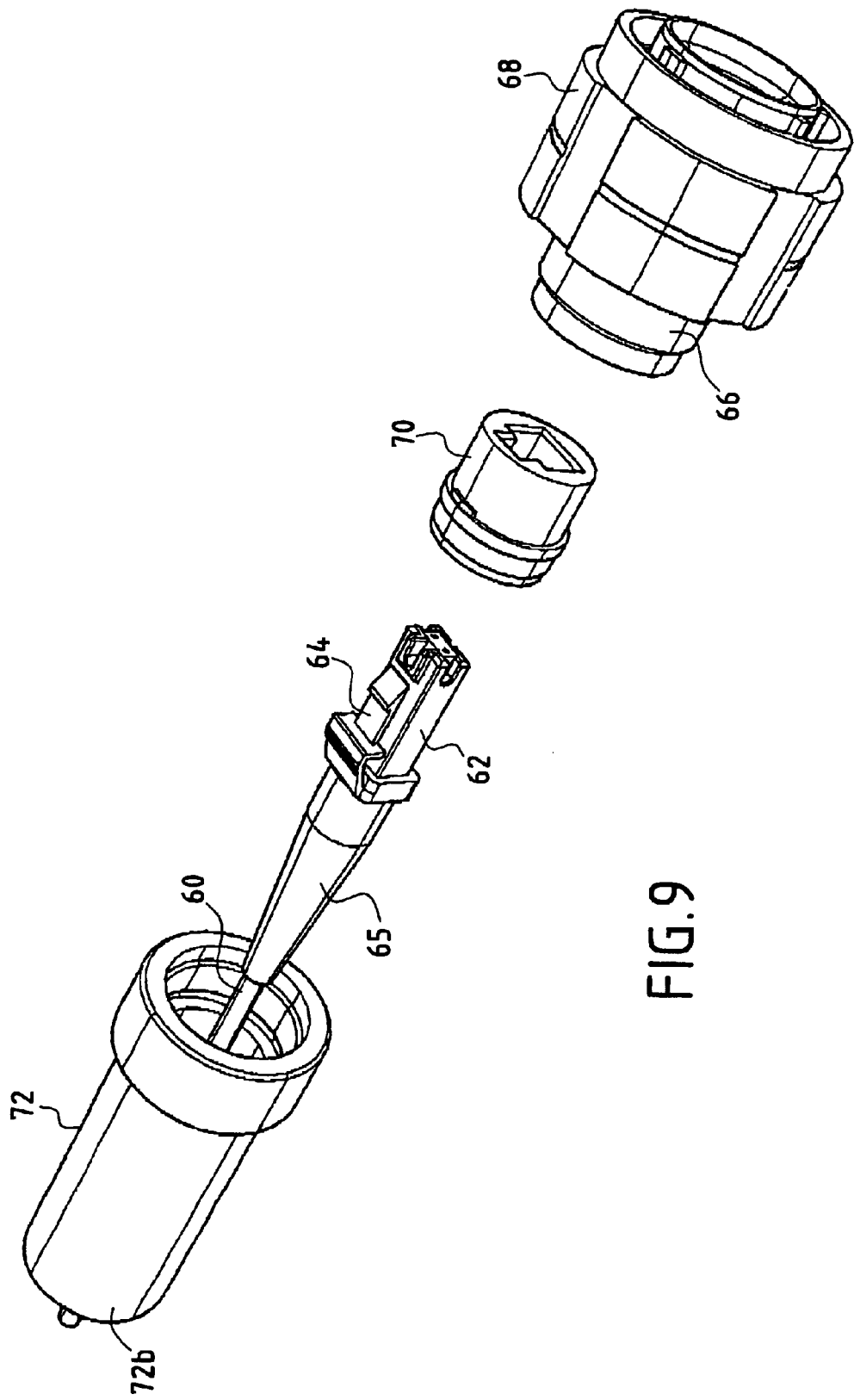
FIG. 9 is an exploded perspective view showing the various components of the plug device in its optical version.

With reference now to FIGS. 9 and 10, an embodiment of the plug device is described that is more particularly adapted to an optical cord.

FIG. 9 is an exploded perspective view of the various component elements of the optical version of the plug device, together with the optical cord.

The optical cord 60 has its end mounted to a cord plug body 62 and it is secured thereto by a ferrule 64. The outside face of the cord plug body has a mechanical latch 64 which is described in greater detail below.

The plug device proper comprises firstly a plug body 66 fitted on its outside face with a nut 68 for securing it with the complementary optical connection element. The plug device also comprises a plug adapter 70 for mounting in the plug body 66. The plug device also comprises a tubular connection piece 72 having a first end for securing to the plug body 66 and having an opposite end 72b for securing in packing (not shown in the figure).

Figure 10A:
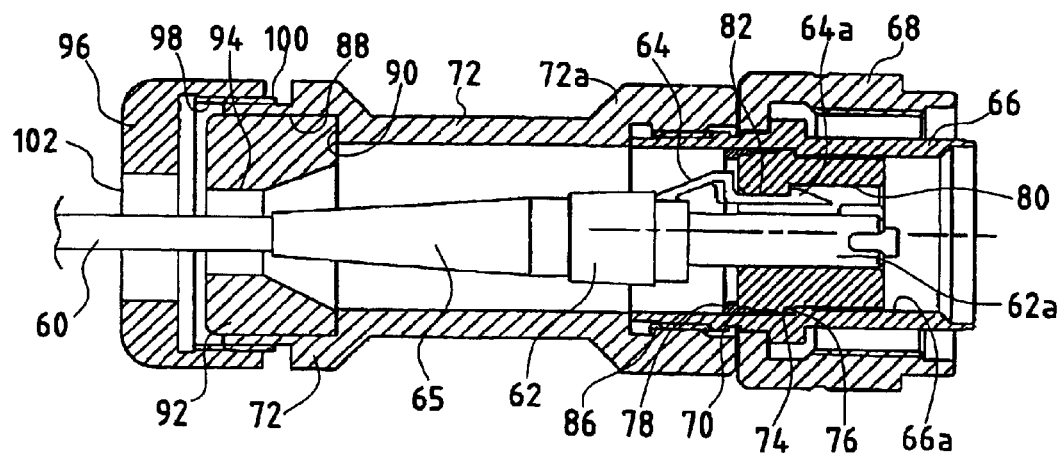
FIG. 10 is a vertical section view through the plug device mounted on an optical cord.

With reference now to FIG. 10A, the plug device of the invention is described in greater detail. The plug body 66 includes in its inside face 66a a shoulder 74 suitable for co-operating with a complementary shoulder 76 formed in the outside face of the adapter 70 so as to prevent it form moving in translation in a forward direction. The adapter 70 can be held stationary in the plug body 66 by installing a mechanical system 78 for providing locking in translation.

As can be seen in the figure, the adapter 70 has an axial opening 80 of outline that enables the end 62a of the cord plug body to be inserted therein. This profile also defines a top groove 80 for passing the mechanical latch 64 of the optical cord plug body. More precisely, and as can be seen in FIG. 10A, the end of the latch 64 has a projecting portion 64a suitable for co-operating with a shoulder 82 formed in the axial passage 80 of the adapter. Co-operation between the projecting portion 64a and the shoulder 82 enables the plug body 62 of the cord to be secured to the adapter. It should be added that the shoulder 82 defines a profile such that the latch 64 is held in its deactivated position.

The first end 72a of the connection piece 72 has a tapped hole suitable for co-operating with a thread 86 formed at the rear end of the plug body 66. The second end 72b of the connection piece 72 defines a housing 88 of greater diameter and a shoulder 90 for receiving packing 92. At rest, and as shown in FIG. 10A, this packing 92 presents an axial passage 94 allowing the plug body 62 of the optical core to pass freely. Finally, the plug device includes a clamping nut 96 whose tapping 98 is suitable for co-operating with an outside thread 100 provided on the end 72b of the connection piece 72. This nut 96 has an axial orifice 102 of diameter (or more generally of dimensions) sufficient to allow the plug body 62 of the optical cord to pass freely.

Figure 10B:
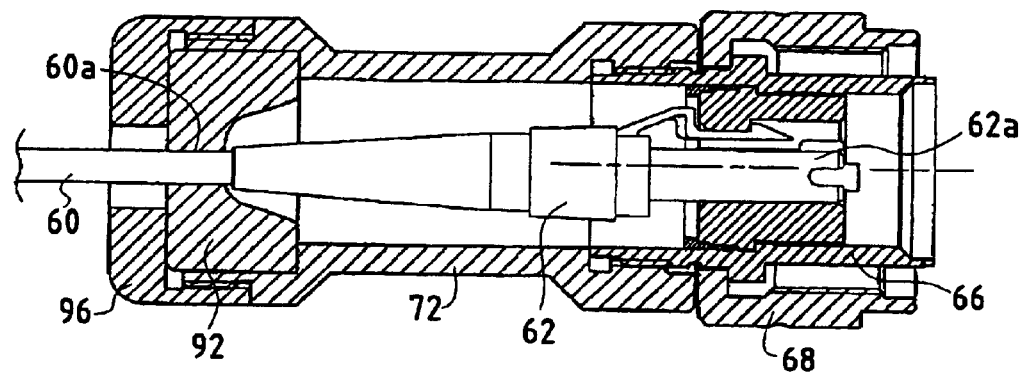

The plug device for mounting on the plug 62 of the optical cord 60 is used as follows. Initially, the connection piece 72, the packing 92, and the clamping nut 96 are engaged around the optical cord 66. Then the front portion 62a of the plug body is engaged in the axial passage 80 of the adapter 70 with the mechanical latch 64 being lowered into its inactive position. After the plug body of the cord has been inserted in the adapter 70, the latch 64 secures the cord plug body to the adapter by means of its projecting portion 64a co-operating with the shoulder 62. This assembly is put into place in the plug body 70 and is prevented from moving by inserting the device 78 that performs locking in translation. Subsequently, the connection piece 72 is screwed onto the rear portion of the plug body 66. Finally, the nut 96 is screwed onto the rear end 72b of the connection piece 72 so as to deform the packing 92, causing it to clamp against the outside face 60a of the optical cord 60. This serves not only to seal the inside volume defined by the connection piece 72 and the plug body 66, but also to secure the optical cord 60 mechanically to the plug device, by means of the above-described clamping. FIG. 10B shows the plug device mounted on the plug 62 of the optical cord 60.

What is claimed:

1. A plug device for a standard electrical or optical connection cord provided at an end with a cord plug fastened to the cord, the cord plug having a body which includes an external mechanical latch, the plug device comprising:

a cylindrical plug body;

a plug adapter distinct from the plug body and having external fastening means for engaging in said plug body;

a packing body including an interior screw thread and a packing of cylindrical shape; and a link part having a first end with a first screw thread for connection with said plug body and a second end with a second screw thread for co-operating with the interior screw thread of said packing body;

said plug adapter having an internal shape suitable for receiving said cord plug therein and for holding said latch of the cord plug in an inactive position; and said packing body, said packing, and said link part all defining respective internal passages of sufficient size to pass the cord plug therethrough;

upon screwing the packing body onto said link part, said packing is compressed, thereby clamping said packing onto the cord, wherein the internal shape of said adapter including a shoulder suitable for co-operating with a projecting portion of the mechanical latch of said cord plug in order to secure said cord plug with said adapter.

2. A plug device according to claim 1, wherein said plug adapter is comprised of two distinct parts, each defining a portion of the internal profile suitable for receiving said cord plug, thereby enabling said two parts of said adapter to be put into place in succession on the cord plug.

3. A plug device according to claim 2, wherein the two parts of said plug adapter are provided with mutual clip means.

4. A plug device according to claim 1, wherein said link part is provided on its second end with an O-ring suitable for co-operating with said packing body.

5. A plug device according to claim 1, wherein said packing body has a rear wall provided with an axial opening suitable for passing the body of said cord plug, said wall serving as an abutment for said packing.

6. A plug device according to claim 2 wherein the internet shape of the two parts forming the adapter, once assembled together, forms a recess for receiving the body of the cord plug and a groove for receiving a control lever of the cord plug latch in a closed position.

7. A plug device according to claim 2, wherein the front face of each part of the plug adapter is provided with an extension projecting from said face; the end of each extension forming an abutment for the cord plug latch when in a deactivated position.

8. A plug device according to claim 1, wherein said adapter is prevented from moving in translation in said plug body by a shoulder provided in the inside wall of the plug body.

* * * * *

UNITED STATES PATENT AND TRADEMARK OFFICE
CERTIFICATE OF CORRECTION

PATENT NO. : 6,817,902 B2  Page 1 of 1
APPLICATION NO. : 10/648516
DATED : November 16, 2004
INVENTOR(S) : Christophe Bernardi et al.

It is certified that error appears in the above-identified patent and that said Letters Patent is hereby corrected as shown below:

Col. 6, line 47 (claim 6), change "internet" to --internal--.

Signed and Sealed this

Seventh Day of November, 2006

JON W. DUDAS
*Director of the United States Patent and Trademark Office*